United States Patent
Gustafson et al.

[19]

[11] Patent Number: 5,888,672
[45] Date of Patent: Mar. 30, 1999

[54] POLYIMIDE BATTERY

[76] Inventors: Scott D. Gustafson, P.O. Box 19245, Jacksonville, Fla. 32245; Joseph T. Antonucci, 11940 Huge Evergreen Ct., Jacksonville, Fla. 32223

[21] Appl. No.: 21,027

[22] Filed: Feb. 9, 1998

Related U.S. Application Data

[60] Provisional application No. 60/086,237, Feb. 12, 1997.
[51] Int. Cl.$^6$ .......................... H01M 6/18; H01M 10/40
[52] U.S. Cl. ........................ 429/314; 429/212; 29/623.5
[58] Field of Search ..................... 429/192, 212, 429/245, 314; 29/623.5

[56] References Cited

U.S. PATENT DOCUMENTS

| | | | |
|---|---|---|---|
| 3,551,211 | 12/1970 | Grulke | 429/192 |
| 4,385,130 | 5/1983 | Molinski et al. | |
| 4,416,915 | 11/1983 | Palmer et al. | |
| 4,598,466 | 7/1986 | Arenas et al. | |
| 4,615,959 | 10/1986 | Hayashi et al. | |
| 4,830,939 | 5/1989 | Lee et al. | |
| 4,977,007 | 12/1990 | Kondo et al. | |
| 5,021,129 | 6/1991 | Arbach et al. | |
| 5,041,346 | 8/1991 | Giles | |
| 5,196,279 | 3/1993 | Tarascon | |
| 5,296,318 | 3/1994 | Gozdz et al. | |
| 5,407,593 | 4/1995 | Whang | |
| 5,418,091 | 5/1995 | Gozdz et al. | |
| 5,445,906 | 8/1995 | Hobson et al. | |
| 5,460,904 | 10/1995 | Gozdz et al. | |
| 5,462,820 | 10/1995 | Tanaka | |
| 5,468,571 | 11/1995 | Fujimoto et al. | |
| 5,470,357 | 11/1995 | Schmutz et al. | |
| 5,491,041 | 2/1996 | Abraham et al. | |
| 5,503,948 | 4/1996 | MacKay et al. | |
| 5,512,389 | 4/1996 | Dasgupta et al. | |
| 5,529,860 | 6/1996 | Skotheim et al. | |
| 5,587,253 | 12/1996 | Gozdz et al. | |
| 5,591,250 | 1/1997 | Stern et al. | |
| 5,597,661 | 1/1997 | Takeuchi et al. | |
| 5,601,947 | 2/1997 | Skotheim et al. | |
| 5,607,485 | 3/1997 | Gozdz et al. | 29/623.5 |
| 5,620,811 | 4/1997 | Zhang et al. | |
| 5,658,691 | 8/1997 | Suzuki et al. | |
| 5,690,702 | 11/1997 | Skotheim et al. | |
| 5,691,081 | 11/1997 | Krause et al. | 429/192 |

OTHER PUBLICATIONS

M.A. Ratner ad D.F. Shriver, "Ion Transport in Solvent–Free Polymers", *Chemical Reviews*, 1988, pp. 109–122, vol. 88, No. 1., American Chemical Society, USA. Month unknown.

Herve Cheradame, "A Comprehensive Theory of the High Ionic Conductivity of Macromolecular Networks," *IUPAC Maccromolecules*, 1982, pp. 251–264, Pergamon Press, New York. Month unknown.

(List continued on next page.)

*Primary Examiner*—Stephen Kalafut
*Attorney, Agent, or Firm*—Joy L. Bryant

[57] ABSTRACT

A battery having at least one anode, at least one cathode, and at least one electrolyte disposed between the anode and the cathode is presented. Each anode comprises an anode current collector, a first soluble, amorphous, thermoplastic polyimide; an electronic conductive filler; and an intercalation material. Each cathode comprises a cathode current collector; a second soluble, amorphous, thermoplastic polyimide; an electronic conductive filler; and a metal oxide. Lastly, each electrolyte comprises a third soluble, amorphous, thermoplastic polyimide and a lithium salt. The process for preparing the battery comprises the steps of preparing an anode slurry, a cathode slurry, and an electrolyte solution. Casting a film of the electrolyte solution to form an electrolyte layer. Coating the anode slurry and the cathode slurry on each respective current collector to form an anode and a cathode. Drying the electrolyte layer, the anode and the cathode and assembling the electrolyte layer, anode and cathode to form a battery.

67 Claims, 3 Drawing Sheets

OTHER PUBLICATIONS

Kenneth S. Cole and Robert H. Cole, "Dispersion and Absorption in Dielectrics: I. Alternating Current Characteristincs," *The Journal of Chemical Physics*, Jan.—Dec. 1941, pp. 341–351, vol. 9, American Institute of Physics, USA. Apr.

J.R. Dahn, Tao Zheng, Yinghu Lu, and J.S. Xue, "Mechanisms for Lithium Insertion in Carbonaceous Materials," *Science*, Oct. 27 1995, pp. 590–593, vol. 270, USA.

N. Oyama, T. Tatsuma, T. Sato, and T. Sotomurs, "Dimercaptan–polyaniline Composite Electrodes for Lithium Batteries with High Energy Density," *Nature*, Feb. 16 1995, pp. 598–600, vol. 373, USA.

J. Simon Xue, Jeffrey A. Read, Edward A. Cuellar, Markus Wittmann, Michael E. Manna, Brendan M. Coffey, and Ralph Wise, "Performance Characteristics of a Marketable Lithium Ion Solid Polymer Battery," Publication Unknown, publication date unknown, pp. 211–216.

V.L. Teofilo, "High Capacity Lithium Solid Polymer Battery Development," Publication Unknown, publication date unknown, pp. 217–220.

K.M. Abraham and Z. Jiang, "PEO–Like Polymer Electrolytes with High Room Temperature Conductivity," *J. Electrochemical Society*, Jun. 1997, pp. 136–138, vol. 14, No. 6, The Electrochemical Society, Inc.

Luying Sun, Katsuhiro Higaki and Robert C. McDonald, "Performance Characteristics of Lithium Ion Cells using in situ Polymerized Electrolytes," Publication Unknown, publication date uknown.

J. Ross MacDonald, "Theory of Space–Charge Polarzation and Electrode–Dischare Effects," *The Journal pf Chemical Physics*, Jun. 1, 1974, pp. 4982–5001, vol. 58, No. 11, USA.

K. Kojima et al., "Secondary Lithium Batteries," Chemical Abstract No. 124:334157, Oct. 21, 1997.

H. Tomiyama, "Secondary Nonaqueous Electrolyte Batteries," Chemical Abstract No. 127:83875, May 20, 1997.

T. Motonami et al., "Secondary Nonaqueous Lithium Batteries with Carbonaceous Electrodes," Chemical Abstract No. 126:120047, Nov. 29, 1996.

T. Uei, "Manufacture of Secondary Lithium Battery Anodes," Chemical Abstract No. 122:60180, Aug. 12, 1994.

T. Otagawa et al., "Three–Dimensional Microstructure as a Substrate for a Battery Electrode," Chemical Abstract No. 120:327532, Mar. 15, 1994.

K. Asami et al., "Carbonaceous Material and Battery Using this Material," Chemical Abstract No. 120:168817, Jul. 28, 1993.

T. Morimoto et al., "Secondary Nonaqueous Batteries with Mixture Anodes," Chemical Abstract No. 112:102125, Jul. 26, 1989.

T. Morimoto et al., "Nonaqueous–electrolyte Load–leveling Battery," Chemical Abstract No. 110:78327, Sep. 8, 1988.

T. Morimoto et al., "Secondary Nonaquesou Batteries," Chemical Abstract No. 110:61123, Sep. 6, 1988.

S. Taguchi et al., "Secondary–Battery Electrodes form Conductive Pyrolysis Production of Polymide," Chemical Abstract No. 107:43127, Dec. 8, 1986.

R. Clark, "Thermal Analysis and Thermal Batteries," Chemical Abstract No. 90:171466, 1976. (Month unknown).

J.J. Auborn et al., "Corrosion and Compatibility of Materials n Inorganic Oxyhalides," Chemical Abstract No. 84:138293, 1974. (Month unknown).

POLYIMIDE BATTERY

CROSS-REFERENCE TO RELATED APPLICATIONS

This application claims the benefit of U.S. Provisional Application No. 60/086,237, filed Feb. 12, 1997, hereby incorporated by reference in its entirety.

FIELD OF THE INVENTION

The present invention relates to lithium ion batteries. In particular, it relates to lithium ion batteries made with soluble, amorphous, thermoplastic polyimides.

BACKGROUND OF THE INVENTION

Lithium battery technology is a relatively new field and the subject of intensive research. The main battery characteristics sought to be improved by new research are size, weight, energy density, capacity, lower self discharge rates, cost and environmental safety. The goal is to simplify the fabrication techniques and improve interlayer adhesion to produce a dry cell battery that is small and light weight, has a long useful life, has greater energy density, and contains little or no toxic compounds that may enter the environment upon disposal. These batteries are useful for many applications such as power supplies for cellular phones, smart cards, calculators, portable computers, and electrical appliances.

Schmutz et al. (U.S. Pat. No. 5,470,357) address a problem with adhesion between the electrode and collector elements. Their solution is to pretreat the collector elements in which a 0.25% to 3.0% solution of a polymeric material compatible with the matrix polymer is applied to the collector foil or grid and dried to form a coated film. The resulting coated collector element is heated to make the polymer tacky. The pretreated coated collector element is further processed by applying the appropriate electrode composition to it to form an anode or a cathode. These electrode and separator elements are formulated as layers of plasticized polymeric matrix compositions that are laminated with the electrically conductive collector elements to form a unitary battery cell structure.

Gozdz et al. (U.S. Pat. No. 5,587,253) disclose a lithium ion battery with an electrolyte/separator composition comprising a polyvinylidene fluoride copolymer and a plasticizer. The crystalline structure of the polyvinylidene fluoride copolymer necessitates the introduction of plasticizers to disrupt the crystalline regions of the copolymer matrix simulating an amorphous region which leads to higher ionic conductivity. In addition, the introduction of plasticizers helps to lower the glass transition temperature of the polymer allowing it to undergo melt flow or softening during the operation of the battery. This helps to facilitate the mobilization of the ions through the membrane. Eventually, the plasticizer must be replaced with an electrolyte salt solution which contains another plasticizer combination of ethylene carbonate and dimethyl carbonate.

The battery is formed by laminating each of the composite anode and cathode compositions separately onto wire grid current collectors. Gozdz et al. further address the problem with adhesion by surface cleaning the electrode elements in a common copper bright solution, rinsing in water, air drying, dip coating in an acetone solution of the copolymer solution and drying it to a tacky state. In particular each electrode was prepared by cutting a film and overlaying it upon the dip coated grid to form an element pair. The element pair was placed between buffer sheets of abherent polyethylene terephthalate and was then passed through a laminating station. An electrode/collector pair was laminated with an interposed electrolyte separator membrane. In order to activate the battery, the laminated battery structure was extracted of a substantial amount of the plasticizer comprising the polymer matrices of the laminated layers, particularly the separator/electrolyte. The extracted battery structure was then activated in preparation for charge/discharge cycle testing by immersion, under a substantially moisture-free atmosphere. During immersion, the battery imbibed an amount of a 1M electrolyte solution of $LiPF_6$ in 50:50 ethylene carbonate (EC):dimethyl carbonate (DMC) for about 20 minutes during which the battery imbibed an amount of solution which substantially replaced the extracted plasticizer with the EC/DMC solution.

Skotheim et al. (U.S. Pat. No. 5,601,947) disclose "gel-type" solid electrolytes that consist of a high molecular weight polymer matrix into which is dissolved an electrolyte salt, then subsequently swollen with a low molecular weight liquid (propylene carbonate, ethylene carbonate, glymes, low molecular weight polysiloxanes, and mixtures thereof) which effectively acts as a plasticizer for the salt-polymer matrix. Useful gel-type electrolytes include sulfonated polyimides which have been swollen. The introduction of these plasticizers affects the dimensional stability of the material in that they have a tendency to leach out of the material causing it to return to a brittle and inflexible state. This affects the ionic mobility of the system and causes the adhesion to fail.

Whang (U.S. Pat. No. 5,407,593) teaches that the main path for ion transportation in a polymer electrolyte is via the amorphous region of a polymer matrix. Thus, the ionic conductivity of a polymeric electrolyte can be increased by diminishing the crystalline region and increasing the amorphous region of the polymer matrix. The methods frequently used to achieve this are: (1) preparing a new polymer such as copolymer or polymer with network structure; (2) adding non-soluble additives to improve the electrolytic property; and (3) adding soluble additives to provide a new path for ionic conductivity. Polymers having high-dielectric constants are good matrices for preparing polymeric electrolytes. However, because they have high glass transition temperatures or high degrees of crystallinity they do not result in desirable polymeric electrolytes. To remedy this, Whang discloses a polymeric electrolyte containing no volatile components. This assures that no change in conductivity and composition occurs due to the volatilization of some compounds contained therein. Thus, the conductivity is kept constant. The polymeric electrolytes of his invention include a polar polymer matrix, a dissociable salt, and a plasticizer of polyether or polyester oligomer with terminal groups halogenated.

Fujimoto et al. (U.S. Pat. No. 5,468,571) disclose a secondary battery with a negative electrode comprising a carbon powder, particles constituting the powder being consolidated with a polyimide binder. The polyimide may be either a thermosetting polyimide or a thermoplastic polyimide, the former including both condensation type and addition type. A representative example of condensation type polyimide resins is one obtained by heat curing (dehydration condensation reaction) a solution of a polyamide acid (a polyimide intermediate) in N-methyl-2-pyrrolidone. The polyamide acid in turn being obtained by reacting an aromatic diamine with an aromatic tetracarboxylic acid anhydride. The heat curing is preferably conducted at a temperature of at least 350 degrees C. for at least two hours to complete the dehydration condensation reaction. They note that if the polyimide intermediate with which the dehydration condensation reaction has not been completed, remains in the negative electrode after the heat curing, it may, when the battery temperature becomes abnormally high, condense to release water which should react vigorously with lithium. Addition type polyimides also require heat curing.

An object of the present invention is to provide a polyimide battery that is based on a soluble, amorphous, thermoplastic polyimide.

Another object is to provide a polyimide electrolyte that does not require swelling or introduction of plasticizers.

Another object is to provide a polyimide battery that exhibits excellent interlayer adhesion.

Another object is to provide a polyimide battery that is capable of dissolving a large amount of lithium salt.

Another object is to provide a polyimide battery that is environmentally safe.

Another object is to provide a polyimide battery that exhibits high ionic conductivity with insubstantial change over a range of temperatures and pressures.

Another object is to provide a process for preparing a polyimide battery.

Another object is to provide a process for preparing a polyimide battery that does not require pre-treatment of the current collectors.

Another object is to provide a process for preparing a polyimide battery that does not require curing of the polyimide.

Another object is to provide a process for preparing a polyimide battery that does not require heating the polyimide above its glass transition temperature.

Another object is to provide a process for preparing a polyimide battery that does not require high temperature and high pressure to form the battery.

Another object is to provide a flexible polyimide battery.

SUMMARY OF THE INVENTION

By the present invention, a polyimide battery having excellent interlayer adhesion, flexibility, and exhibits high ionic conductivity ($1 \times 10^{-4}$ ohms$^{-1}$ cm$^{-1}$) over a range of temperatures and pressures is presented. The battery comprises at least one anode, at least one cathode, and at least one electrolyte disposed between the anode and the cathode. Each anode comprises an anode current collector, a first soluble, amorphous, thermoplastic polyimide, an electronic conductive filler, and an intercalation material. Each cathode comprises a cathode current collector, a second soluble, amorphous, thermoplastic polyimide, an electronic conductive filler, and a metal oxide. Lastly, each electrolyte comprises a third soluble, amorphous, thermoplastic polyimide and a lithium salt. The first, second and third soluble, amorphous thermoplastic polyimides may or may not have the same chemical composition and may exist in various combinations thereof.

Fabrication of the battery is simple and requires a minimal number of steps. An anode slurry is prepared from a first, soluble, amorphous, thermoplastic polyimide solution, an electronic conductive filler, and an intercalation material. A cathode slurry comprising a second, soluble, amorphous, thermoplastic polyimide solution, an electronic conductive filler, and a metal oxide is also prepared. Lastly, an electrolyte solution comprising a third soluble, amorphous, thermoplastic polyimide solution and a lithium salt is prepared. The electrolyte solution is cast as a film to form an electrolyte layer. The anode slurry is coated on a first current collector to form an anode and the cathode slurry is coated on a second current collector to form a cathode. The electrolyte layer, the anode and the cathode are dried. The anode is loaded with lithium ions by soaking the anode in a lithium salt solution. Lastly, the anode, the electrolyte layer, and the cathode are assembled to form a battery.

This fabrication technique affords several advantages over prior techniques. One advantage is that the current collectors do not have to undergo any pretreatment process before the anode and cathode slurries are applied. In addition, the anode and cathode slurries are applied by coating them on to the current collectors as opposed to laminating them on to the current collectors. Since the polyimide is a soluble, amorphous, thermoplastic polyimide, it exists as a fully imidized powder before it is mixed into the system. In turn, there is no need to heat the anode, cathode and electrolyte layer to a high temperature to drive a polymerization reaction. Instead, low temperature heat is applied to remove the solvent and dry out the polymer. In addition, since imidization has already taken place before the polymer is placed into the system, there are no byproducts of the condensation reaction, such as water, to interact with the lithium salt. Lastly, the amorphous property of the polyimide affords a natural path for ionic conductivity. In turn, there is no need to create a path through the addition of plasticizers or other low molecular weight additives. The resulting battery is flexible, exhibits excellent interlayer adhesion, and exhibits ionic conductivity over a range of temperatures.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Figure 1:
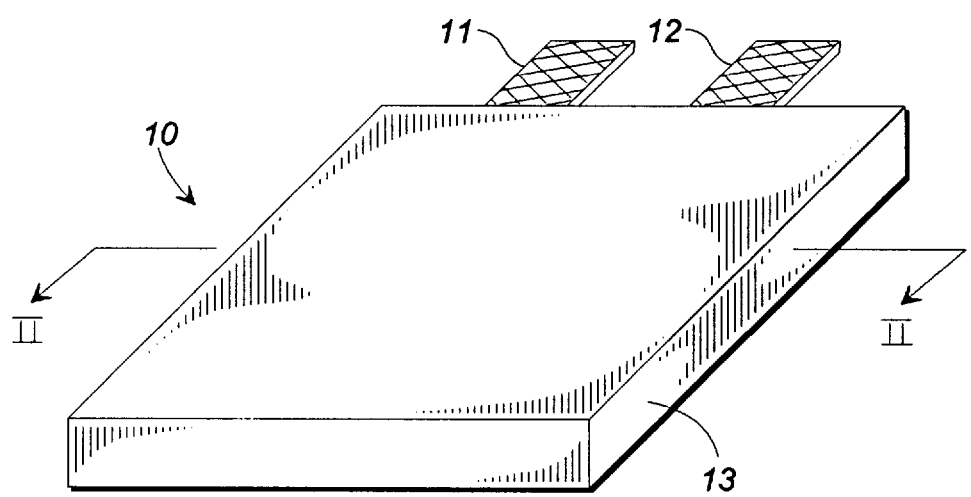
FIG. 1 is a perspective view of the polyimide battery of the present invention.

The polyimide battery of the present invention exhibits excellent interlayer adhesion, is flexible, environmentally safe, and exhibits ionic conductivity over a range of temperatures and pressures. The battery comprises at least one anode, at least one cathode, and at least one electrolyte disposed between each anode and each cathode. The anode, cathode, and electrolyte can be applied as very thin layers, or layers less than 1 mil in thickness. Because of this capability, the anode, cathode and electrolyte can be stacked in multiple layers similar to a multi-layer circuit board. In turn, the battery may comprise such combinations as: 1) an anode, an electrolyte, and a cathode; 2) two anodes, two electrolytes, and one cathode; 3) two cathodes, two electrolytes, and one anode; 4) many anodes, many electrolytes, and many cathodes; or 5) a bipolar configuration such that one cathode is folded around an anode, which has been surrounded by the electrolyte. The ultimate configuration is dependent upon the desired application for the battery. FIG. 1 shows the simplest configuration for the battery 10 where there is an anode current collector 11 and a cathode current collector 12 protruding from the main body portion of the battery for connection to the desired circuitry and for delivery of the voltage and current or recharge of the battery. The main body portion is encased in a cover film 13, which is a single or multi-layer film non-permeable to gases or liquid. Preferably, the cover film is a very thin, high barrier, laminated foil film of a type which is suitable for the application and is easily processable with regard to formation of the battery. Many of these cover films are well know in the industry such as KAPAK KSP-150 or KSP-120 tri-laminate film produced by Kapak, Inc. Alternatively, multi-layer 48 gauge PET/LDPE/0.000285 foil film produced by Sealright Flexible Packaging Group may also be used.

Figure 2:
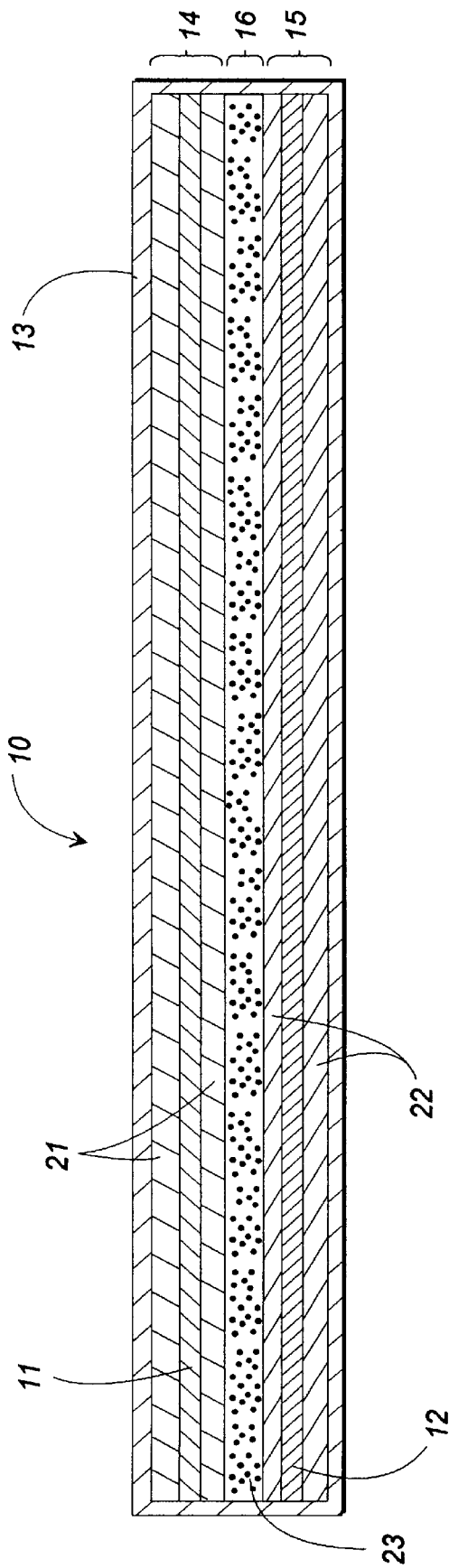
FIG. 2 is a cross-sectional view taken along lines II—II of FIG. 1.

Referring now to FIG. 2, a representational cross-section of the composition of the battery 10 is presented. Each anode 14 comprises an anode current collector 11, a first soluble, amorphous, thermoplastic polyimide (not shown), an electronic conductive filler (not shown) and an intercalation material (not shown). The anode current collector 11 may be prepared from any material known to those skilled in the art. It is an electrically conductive member made of a metal, such as aluminum. Preferably, the anode current collector 11 is a thin (approximately 0.5–1.0 mil) expanded foil having regular aperatures therein, such as found in a mesh or screen. A portion of the anode current collector 11 extends from the main body of the battery 10 to provide an external connection means, but the majority of the anode current collector 11 is situated within the cover 13 and encased in an anode composite material 21. The anode composite material 21 is comprised of a first soluble, amorphous, thermoplastic polyimide, an electronic conductive filler, and an intercalation material. The first soluble, amorphous, thermoplastic polyimide is any soluble, amorphous, thermoplastic polyimide known to those skilled in the art. The first soluble, amorphous, thermoplastic polyimide may have the same chemical composition as or have a different chemical composition as the second and third soluble, amorphous, thermoplastic polyimides which are used for the cathode and the electrolyte, respectively. In particular, these polyimides include but are not limited to: MATRIMID XU5218 commercially available from Ciba-Geigy; ULTEM 1000P commercially available from General Electric; and LaRC-CP1, LaRC-CP2 and LaRC-SI all of which are available from Imitec, Inc., Schenectady, N.Y. Any electronic conductive filler known to those skilled in the art may be blended with the first soluble, amorphous, thermoplastic polyimide and a solvent to form a slurry. Examples of the electronic conductive filler include but are not limited to: conductive carbon, carbon black, graphite, graphite fiber, and graphite paper. In addition to the electronic conductive filler, an intercalation material also forms part of the anode. Any intercalation material known to those skilled in the art may be used and in particular, is selected from the group consisting of: carbon, activated carbon, graphite, petroleum coke, a lithium alloy, nickel powder, and a low voltage lithium intercalation compound. As an alternative embodiment, the anode may further comprise a lithium salt. Any lithium salt known to those skilled in the art may be used but in particular those selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$). Most preferably, the lithium salt is Li(PF$_6$). Addition of the lithium salt to the anode results in increased ionic conductivity.

The cathode 15 comprises a cathode current collector 12. As with the anode current collector, a portion of the cathode current collector 12 extends from the main body of the battery 10 to provide an external connection means. However, the majority of the cathode current collector 12 is situated within the cover 13 and is encased within a cathode composite material 22. The cathode current collector 12 is any cathode current collector known to those skilled in the art and is preferably a thin (ranging from about 0.25–1.0 mil) expanded metal foil having aperatures therein. Preferably, the metal is copper. The aperatures are usually of a regular configuration such as that found in a mesh or screen. The cathode composite material 22 is comprised of a second soluble, amorphous, thermoplastic polyimide, an electronic conductive filler, and a metal oxide. The second soluble, amorphous, thermoplastic polyimide may or may not be of the same chemical composition as the first and third soluble, amorphous, thermoplastic polyimides which are used in the anode and the electrolyte, respectively. The second soluble, amorphous, thermoplastic polyimide may be any soluble, amorphous, thermoplastic polyimide known to those skilled in the art. Specific examples include but are not limited to: MATRIMID XU5218 commercially available from Ciba-Geigy; ULTEM 1000P commercially available from General Electric; LaRC-CP1, LaRC-CP2, and LaRC-Si all of which are available from Imitec, Inc., Schenectady, N.Y. Any electronic conductive filler known to those skilled in the art may be blended with the second soluble, amorphous, thermoplastic polyimide and a solvent to form a slurry. Examples of such electronic conductive fillers include but are not limited to: conductive carbon, carbon black, graphite, graphite fiber, and graphite paper. In addition, the cathode comprises a metal oxide. Any metal oxide known to those skilled in the art may be used but in particular, the metal oxide is selected from the group consisting of: LiCoO$_2$; LiMnO$_2$; LiNiO$_2$; V$_6$O$_{13}$; V$_2$O$_5$; and LiMn$_2$O$_4$. As an alternative embodiment, the cathode may further comprise a lithium salt. Any lithium salt known to those skilled in the art may be used but in particular those selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$). Most preferably, the lithium salt is Li(PF$_6$). As with the anode, addition of a lithium salt to the cathode results in an increase in ionic conductivity.

The electrolyte 16 is disposed between the anode 14 and the cathode 15. The electrolyte 16 comprises a third soluble, amorphous, thermoplastic polyimide and a lithium salt 23. The third soluble, amorphous, thermoplastic polyimide may be any soluble, amorphous, thermoplastic polyimide known to those skilled in the art and may or may not be of the same chemical composition as the first and second soluble, amorphous, thermoplastic polyimides which are used for the anode and the cathode, respectively. Specific examples include but are not limited to: MATRIMID XU5218 commercially available from Ciba-Geigy; ULTEM 1000P commercially available from General Electric; LaRC-CP1, LaRC-CP2, and LaRC-Si available from Imitec, Inc., Schenectady, N.Y. The lithium salt is any lithium salt known to those skilled in the art. In particular, the lithium salt is a member selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$). Most preferably, the lithium salt is Li(PF$_6$). In a preferred embodiment, the electrolyte comprises from about 2% by weight to about 10% by weight of the soluble, amorphous, thermoplastic polyimide and from about 1% by weight to about 12% by weight of the lithium salt.

The key to the invention lies in the soluble, amorphous, thermoplastic polyimides. The soluble, amorphous, thermoplastic polyimides used in the present invention are fully imidized and are usually powder in form. In order to produce the film, coating or a slurry from the polyimide, it must be dissolved in a solvent such as N,N-methylpyrolidinone (NMP), dimethylacetamide (DMAc), and dimethylformamide (DMF). Note that the polyimides dissolve in these solvents. The solvent is not used to swell the polymer, nor will the polymer swell since it is a thermoplastic. Also, since the polyimides are fully imidized, there is no need to further cure them at higher temperatures which may cause damage to the battery. Instead, the polyimides are dried at the flash point of the solvent strictly for the purpose of removing the solvent. No further polymerization will occur, thus there are no byproducts of the condensation reaction (water) to interact with the lithium salts. The amorphous characteristic of the polyimide provides an unobstructed pathway for ionic mobility, unlike the crystalline or semi-crystalline polymers previously used. In addition, it was discovered that large amounts of lithium salts could be dissolved in these polyimide solutions without disturbing the polymer matrix. Lastly, these polyimides exhibited excellent adhesion to the current collectors as well as excellent adhesion between the interlayers. This interlayer adhesion reduces the resistance and polarization effects in the battery.

The chemical compositions of the first, second and third soluble, amorphous, thermoplastic polyimides may exist in various combinations. For example, all three polyimides may be the same such as MATRIMID XU5218. Alternatively, other combinations may exist such as: 1) the first and second polyimides are the same and the third one different; 2) the first and third polyimides are the same and the second one different; 3) the second and third polyimides are the same and the first one is different; or 4) all three polyimides are different.

The fabrication process for the polyimide battery of the present invention is easier than previous processes. In particular, the process does not require pretreatment of the current collectors. In addition, the polyimide polymer does not require further curing nor does it need to be heated above its glass transition temperature to be processed. Lastly, the polyimide battery does not require high temperature or pressure to form the laminate.

The process comprises several steps. First, an anode slurry comprising a first soluble, amorphous, thermoplastic polyimide solution; an electronic conductive filler; and an intercalation material is prepared. The first soluble, amorphous, thermoplastic polyimide solution is prepared by mixing about 8% to about 20% by weight of a first soluble, amorphous, thermoplastic polyimide powder with about 80% to about 92% by weight of a solvent. The first soluble, amorphous, thermoplastic polyimide powder may or may not have the same chemical composition as that found in the electrolyte or the cathode slurry. As an alternative embodiment, a lithium salt is added to the first soluble, amorphous, thermoplastic polyimide solution.

A cathode slurry comprising a second soluble, amorphous, thermoplastic polyimide solution; an electronic conductive filler; and a metal oxide is prepared. The second soluble, amorphous, thermoplastic polyimide solution is prepared by mixing about 8% to about 20% by weight of a second soluble, amorphous, thermoplastic polyimide powder with about 80% to about 92% by weight of a solvent. The second soluble, amorphous, thermoplastic polyimide powder may or may not have the same chemical composition as that found in the electrolyte or the anode slurry. As an alternative embodiment, a lithium salt is added to the second soluble, amorphous, thermoplastic polyimide solution.

An electrolyte solution comprising a third soluble, amorphous, thermoplastic polyimide solution and a lithium salt is prepared. The third soluble, amorphous, thermoplastic polyimide solution is prepared by mixing about 8% to about 20% by weight of a first soluble, amorphous, thermoplastic polyimide powder with about 80% to about 92% by weight of a solvent. About 20% to about 35% by weight of a lithium salt is dissolved in about 65% to about 80% by weight of a solvent to form a solution. The solution is then mixed with the first soluble, amorphous, thermoplastic polyimide solution to form the electrolyte solution. The electrolyte comprises from about 2% by weight to about 10% by weight of the soluble, amorphous, thermoplastic polyimide and from about 1% by weight to about 12% by weight of the lithium salt.

An electrolyte layer is formed by casting a film of the electrolyte solution. The film is cast using standard thin film methodology, such as spin casting or using a doctor blade to draw down the solution to a film ranging from about 0.25 mils to about 20 mils in thickness. The electrolyte layer is dried using any method known to those skilled in the art and, in particular, in an oven at about 70 to about 150 degrees C. for about 20 to about 60 minutes to drive off the solvent. In particular, the electrolyte layer can be fully dried in an oven at about 150 degrees C. for about 30 to 60 minutes to create an opaque, flexible, smooth, tough film.

An anode is formed by coating the anode slurry on a first current collector. Any coating technique known to those skilled in the art may be used provided it is not laminating. Such coating techniques include but are not limited to: vapor deposition, dip coating, spin coating, screen coating, and coating with a brush. No preparation of the current collector is required. Moreover, the anode slurry is applied to the first current collector at a relatively thin layer. The anode is dried using any method known to those skilled in the art and, in particular, in a gravity flow oven for about 20 to about 60 minutes at approximately 70 to 150 degrees C. to drive off the solvent and leave a tacky film. Preferably, the anode can be fully dried in an oven at about 150 degrees C. for about 30 to 60 minutes. It was observed that the anode slurry had excellent adhesion to the first current collector. The anode is loaded with lithium ions by soaking the anode in a 1 Molar lithium salt solution for about 20 to about 45 minutes. The lithium salt solution comprises a lithium salt dissolved in a 50/50 blend of ethylene carbonate (EC)/propylene carbonate (PC). After the anode is finished soaking, it is wiped dry to remove the excess solution.

A cathode is formed by coating the cathode slurry on a second current collector. Any coating technique known to those skilled in the art may be used provided it is not laminating. Such coating techniques include but are not limited to: vapor deposition, dip coating, spin coating, screen coating, and coating with a brush. As with the anode, no preparation of the current collector is required. The cathode slurry is applied to the second current collector at a relatively thin layer. The cathode is dried using any method known to those skilled in the art and, in particular, in an oven for about 20 to about 60 minutes at approximately 70 to 150 degrees C. to drive off the solvent and leave a tacky film. Alternatively, the cathode can be fully dried in an oven at about 150 degrees C. for about 30 to 60 minutes. It was observed that the cathode slurry had excellent adhesion to the second current collector.

The anode, electrolyte layer and the cathode are assembled to form a battery. The assembly process takes place using several methods. In one embodiment, the anode is provided. At least one drop of the electrolyte solution is applied to the anode. A drop is defined as a quantity expressed from a standard pipette. The underside of the electrolyte layer is positioned over the anode such that the electrolyte solution is disposed therebetween. At least one drop of the electrolyte solution is applied to the upperside of the electrolyte layer. Alternatively, a drop of the electrolyte solution could be applied to the cathode instead of the electrolyte layer. The cathode is positioned over the upperside of the electrolyte layer wherein the electrolyte solution is disposed therebetween to form an assembly. The assembly is heated at a temperature sufficient to allow the electrolyte solution to dry and wherein each soluble, amorphous, thermoplastic polyimide undergoes softening or melt flow. The softening of the polymer allows for intimate lateral contact to take place between the layers, ultimately forming a uniform assembly which is self-bonded and exhibits excellent adhesion between the interlayers. After the assembly is heated, it is allowed to cool to room temperature. As an additional step, the assembly is placed in a protective casing and charged at 0.5 milliamps using a constant voltage or constant current.

As an alternative method for assembly, the electrolyte layer, the anode and the cathode are dried to a tacky state. The battery is assembled by providing the anode. The electrolyte layer is positioned over the anode. The cathode is positioned over the electrolyte layer to form an assembly. Pressure is applied to the assembly. Pressure may be as minimal as merely pressing the layers together by hand or by applying pressure in a press. The amount of pressure required is sufficient to allow for intimate contact to be made between the layers. In an additional step to the process, the assembly is heated to a temperature wherein each soluble amorphous, thermoplastic polyimide undergoes melt flow. The assembly is then allowed to cool to room temperature. Lastly, the assembly is enclosed in a protective casing and charged at 0.5 milliamps using a constant voltage or constant current. The polyimide batteries resulting from this process exhibit excellent interlayer adhesion, are flexible, and exhibit ionic conductivity over a range of temperatures.

EXAMPLES

Example 1

An electrolyte solution was prepared according to the following formulation:

| Raw Material | % by weight |
|---|---|
| Li(PF$_6$) | 8.5 |
| MATRIMID XU5218 | 6.4 |
| NMP | 85.1 |

The 8.0 grams of Li(PF$_6$) was dissolved in 40 grams of NMP under a dry, inert atmosphere and constant stirring to form a solution. In a separate flask, 6.0 grams of MATRIMID XU5218 soluble, amorphous, thermoplastic polyimide, commercially available from Ciba-Geigy, was dissolved in 40 grams of NMP. The lithium salt solution was then added to the soluble polyimide solution under constant stirring.

Figure 3:
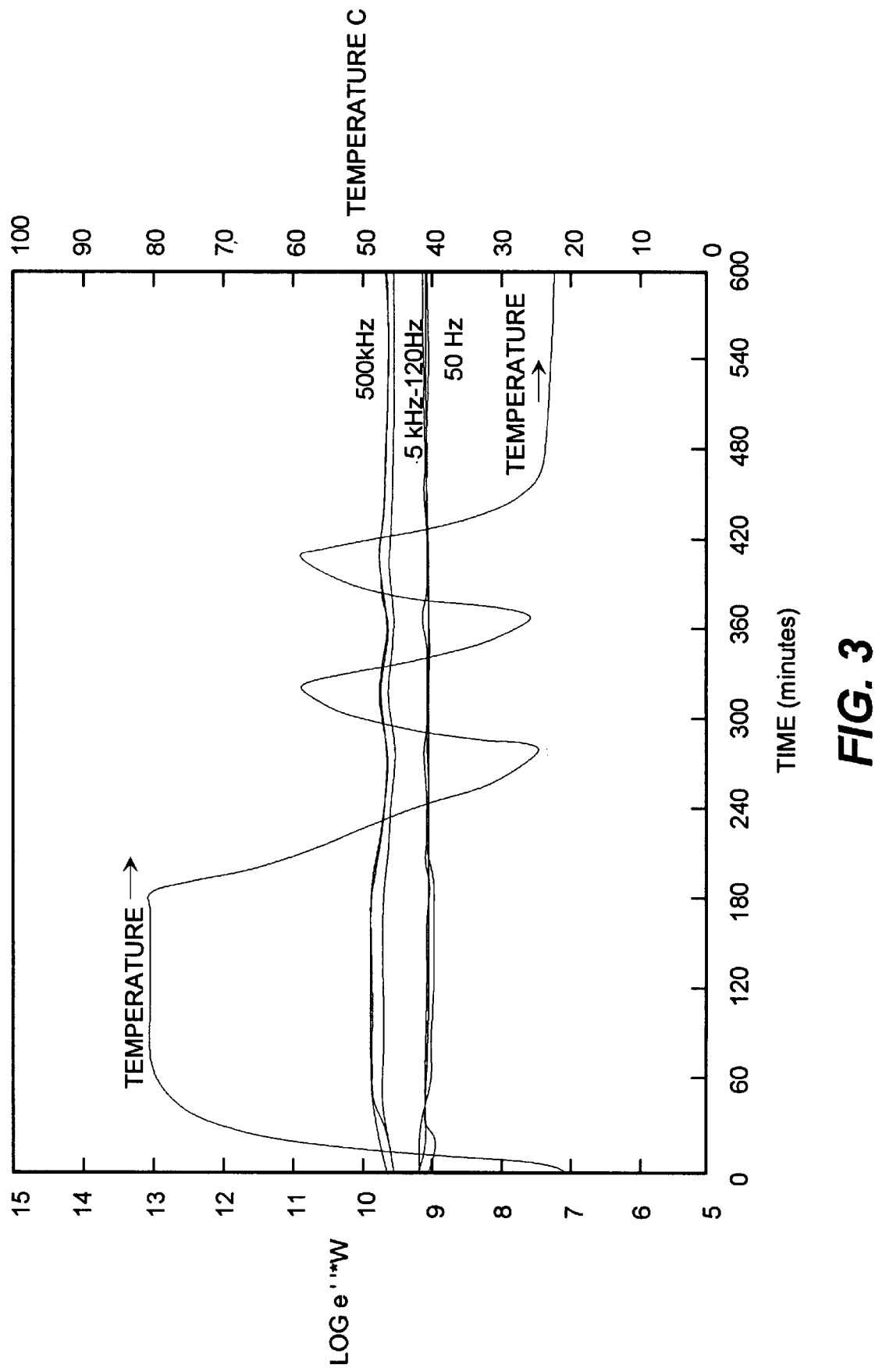
FIG. 3 is a plot of the conductivity at various temperatures.

A film was cast using a doctor blade set for a thickness of 6 to 8 mils. The film was dried in an oven at about 140 degrees C. for about 30 to 45 minutes to yield an opaque, flexible, smooth, tough film of about 0.5 mil in thickness. Conductivity testing was conducted on the electrolyte layer at various temperatures. The temperature cycle involved a ramp and hold of 80 degrees C. followed by two ramps up and down from room temperature to 60 degrees C. The value of log ($\epsilon$"*2 $\pi$F) was approximately $1.1 \times 10^9$ throughout this temperature sequence. Since $\sigma = \epsilon_0 \epsilon$"*2 $\pi$F where $\epsilon_0 = 8.85 \times 10^{-14}$ J$^{-1}$ cm$^{-1}$ the value of $\sigma$ was $1 \times 10^{-4}$ ohms$^{-1}$ cm$^{-1}$ throughout this temperature range. Results from the test are shown in FIG. 3.

Example 2

An anode was prepared according to the following formulation:

| Raw Material | % by weight |
|---|---|
| Graphite | 46.0 |
| Carbon Black | 2.4 |
| Li(PF$_6$) | 2.3 |
| MATRIMID XU5218 | 3.4 |
| NMP | 45.9 |

The soluble, amorphous, thermoplastic polyimide, MATRIMID XU5218, commercially available from Ciba-Geigy, was dissolved in a portion of the NMP to form a polyimide solution. To the polyimide solution, was added the graphite and carbon. In a separate flask, the Li(PF$_6$) was dissolved in a portion of the solvent to form a lithium salt solution. The lithium salt solution was added to the polyimide solution to form a slurry. The slurry was ball milled for approximately 60 minutes. The slurry was then let down with the remaining solvent and balled milled for another 60 minutes. The resulting anode slurry was coated on to a strip of aluminum and dried in an oven for about 20 to 60 minutes at approximately 70 to 150 degrees C. The anode was loaded with lithium ions by soaking the anode in a 1 Molar lithium salt solution for about 20 to about 45 minutes. The lithium salt solution comprises Li(PF$_6$) dissolved in a 50/50 blend of ethylene carbonate (EC)/propylene carbonate (PC) to form a 1 Molar solution. After the anode was finished soaking, it was wiped dry to remove the excess solution.

Example 3

A cathode was prepared according to the following formulation:

| Raw Material | % by weight |
|---|---|
| Metal oxide | 42.34 |
| Carbon Black | 4.77 |
| Li(PF$_6$) | 2.24 |
| MATRIMID XU5218 | 4.84 |
| NMP | 45.81 |

The soluble, amorphous, thermoplastic polyimide, MATRIMID XU5218, commercially available from Ciba-Geigy, was dissolved in a portion of the NMP to form a polyimide solution. To the polyimide solution, was added the oxide and carbon. In a separate flask, the $Li(PF_6)$ was dissolved in a portion of the solvent to form a lithium salt solution. The lithium salt solution was added to the polyimide solution to form a slurry. The slurry was ball milled for approximately 60 minutes. The slurry was then let down with the remaining solvent and ball milled for another 60 minutes. The resulting cathode slurry was coated on to a strip of copper and dried in an oven for about 20 to 60 minutes at approximately 70 to 150 degrees C.

Example 4

A battery was prepared using the electrolyte layer of example 1, the anode of example 2, and the cathode of example 3. A drop of the electrolyte solution prepared in example 1 was applied to the surface of the anode. The electrolyte layer was placed over the anode such that the electrolyte solution served as an adhesive. A second drop of the electrolyte solution was applied to the upper side of the electrolyte layer and the cathode placed on top of it. The assembly was then squeezed together by hand and placed into an oven. The assembly was heated to about 150 degrees C. for about 30 to 60 minutes. The assembly was then allowed to cool to room temperature and was observed for any sign of delamination. There was no failure of interlayer adhesion. The assembly was then placed inside a protective casing and charged at 0.5 milliamps using constant voltage or constant current, forming a final battery product.

Example 5

Several batteries of example 4 were connected to power a cellular phone. The cellular phone was used to place several long distance and local calls. Each call lasted approximately five minutes without interruption. The batteries were recharged after each call.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A battery comprising:
   at lease one anode, each anode comprising: an anode current collector, a first soluble, amorphous, thermoplastic polyimide, wherein the polyimide is soluble in a solvent selected from the group consisting of: N,N-methylpyrolidinone (NMP); dimethylacetamide (DMAc); and diethylformamide (DMF); an electronic conductive filler; and an intercalation material;
   at least one cathode, each cathode comprising: a cathode current collector; a second soluble, amorphous, thermoplastic polyimide, wherein the polyimide is soluble in a solvent selected from the group consisting of: N,N-methylpyrolidinone (NMP); dimethylacetamide (DMAc); and dimethylformamide (DMF); an electronic conductive filler; and a metal oxide; and
   at least one electrolyte disposed between each anode and each cathode; wherein each electrolyte comprises: a third, soluble, amorphous, thermoplastic polyimide, wherein the polyimide is soluble in a solvent selected from the group consisting of: N,N-methylpyrolidinone (NMP): dimethylactamide (DMAc); and dimethylformamide (DMF); and a lithium salt.

2. A battery according to claim 1, wherein the first, second and third soluble amorphous, thermoplastic polyimides have the same chemical composition.

3. A battery according to claim 2, wherein the cathode further comprises a lithium salt.

4. A battery according to claim 3, wherein the lithium salt is selected from the group consisting of: LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)_2N$, $Li(CF_3SO_2)_3$, $Li(CF_3CO_2)$, $Li(B(C_6H_5)_4)$, $Li(SCN)$, and $Li(NO_3)$.

5. A battery according to claim 4, wherein the lithium salt is $Li(PF_6)$.

6. A battery according to claim 2, wherein the anode further comprises a lithium salt.

7. A battery according to claim 6, wherein the lithium salt is selected from the group consisting of: LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)_2N$, $Li(CF_3SO_2)_3$, $Li(CF_3CO_2)$, $Li(B(C_6H_5)_4)$, $Li(SCN)$, and $Li(NO_3)$.

8. A battery according to claim 7, wherein the lithium salt is $Li(PF_6)$.

9. A battery according to claim 6, wherein the cathode further comprises a lithium salt.

10. A battery according to claim 9, wherein the lithium salt is selected from the group consisting of: LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)_2N$, $Li(CF_3SO_2)_3$, $Li(CF_3CO_2)$, $Li(B(C_6H_5)_4)$, $Li(SCN)$, and $Li(NO_3)$.

11. A battery according to claim 10, wherein the lithium salt is $Li(PF_6)$.

12. A battery according to claim 1, wherein the first and the second soluble, amorphous, thermoplastic polyimides have the same chemical composition.

13. A battery according to claim 12, wherein the cathode further comprises a lithium salt.

14. A battery according to claim 13, wherein the lithium salt is selected from the group consisting of: LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)_2N$, $Li(CF_3SO_2)_3$, $Li(CF_3CO_2)$, $Li(B(C_6H_5)_4)$, $Li(SCN)$, and $Li(NO_3)$.

15. A battery according to claim 14, wherein the lithium salt is $Li(PF_6)$.

16. A battery according to claim 12, wherein the anode further comprises a lithium salt.

17. A battery according to claim 16, wherein the lithium salt is selected from the group consisting of: LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)_2N$, $Li(CF_3SO_2)_3$, $Li(CF_3CO_2)$, $Li(B(C_6H_5)_4)$, $Li(SCN)$, and $Li(NO_3)$.

18. A battery according to claim 17, wherein the lithium salt is $Li(PF_6)$.

19. A battery according to claim 16, wherein the cathode further comprises a lithium salt.

20. A battery according to claim 19, wherein the lithium salt is selected from the group consisting of: LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)_2N$, $Li(CF_3SO_2)_3$, $Li(CF_3CO_2)$, $Li(B(C_6H_5)_4)$, $Li(SCN)$, and $Li(NO_3)$.

21. A battery according to claim 20, wherein the lithium salt is $Li(PF_6)$.

22. A battery according to claim 1, wherein the first and third soluble, amorphous, thermoplastic polyimides have the same chemical composition.

23. A battery according to claim 22, wherein the cathode further comprises a lithium salt.

24. A battery according to claim 23, wherein the lithium salt is selected from the group consisting of: LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)_2N$, $Li(CF_3SO_2)_3$, $Li(CF_3CO_2)$, $Li(B(C_6H_5)_4)$, $Li(SCN)$, and $Li(NO_3)$.

25. A battery according to claim 24, wherein the lithium salt is Li(PF$_6$).

26. A battery according to claim 22, wherein the anode further comprises a lithium salt.

27. A battery according to claim 26, wherein the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$).

28. A battery according to claim 27, wherein the lithium salt is Li(PF$_6$).

29. A battery according to claim 26, wherein the cathode further comprises a lithium salt.

30. A battery according to claim 29, wherein the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$).

31. A battery according to claim 30, wherein the lithium salt is Li(PF$_6$).

32. A battery according to claim 1, wherein the second and third soluble, amorphous, thermoplastic polyimides have the same chemical composition.

33. A battery according to claim 32, wherein the cathode further comprises a lithium salt.

34. A battery according to claim 33, wherein the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$).

35. A battery according to claim 34, wherein the lithium salt is Li(PF$_6$).

36. A battery according to claim 32, wherein the anode further comprises a lithium salt.

37. A battery according to claim 36, wherein the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$).

38. A battery according to claim 37, wherein the lithium salt is Li(PF$_6$).

39. A battery according to claim 36, wherein the cathode further comprises a lithium salt.

40. A battery according to claim 39, wherein the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$).

41. A battery according to claim 40, wherein the lithium salt is Li(PF$_6$).

42. A battery according to claim 1, wherein the anode current collector comprises an expanded metal foil having apertures.

43. A battery according to claim 42, wherein the metal is aluminum.

44. A battery according to claim 1, wherein the intercalation material is selected from the group consisting of: carbon, activated carbon, graphite, petroleum coke, a lithium alloy, nickel powder, and a low voltage lithium intercalation compound.

45. A battery according to claim 1, wherein the cathode current collector is an expanded metal foil having aperatures therein.

46. A battery according to claim 45, wherein the metal is copper.

47. A battery according to claim 1, wherein the metal oxide is selected from the group consisting of: LiCoO$_2$; LiMnO$_2$; LiNiO$_2$; V$_6$O$_{13}$; V$_2$O$_5$; and LiMn$_2$O$_4$.

48. A battery according to claim 1, wherein the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$).

49. A battery according to claim 48, wherein the lithium salt is Li(PF$_6$).

50. An electrolyte comprising a soluble, amorphous, thermoplastic polyimide, wherein the polyimide is soluble in a solvent selected from the group consisting of: N,N-methylpyrolidinone (NMP); dimethylacetamide (DMAc); and dimethylformamide (DMF); and a lithium salt.

51. An electrolyte according to claim 50, wherein the lithium salt is selected from the group consisting of: LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_3$CO$_2$), Li(B(C$_6$H$_5$)$_4$), Li(SCN), and Li(NO$_3$).

52. An electrolyte according to claim 50, wherein the electrolyte comprises from about 2% by weight to about 10% by weight of a soluble, amorphous, thermoplastic polyimide and from about 1% by weight to about 12% by weight of a lithium salt.

53. A process for preparing a battery, the process comprising the steps of:
a) preparing an anode slurry comprising a first soluble, amorphous, thermoplastic polyimide dissolved in a solvent selected from the group consisting of: N,N-methylpyrolidinone (NMP); dimethylacetamide (DMAc); and dimethylformamide (DMF); an electronic conductive filler, and an intercalation material;
b) preparing a cathode slurry comprising a second soluble, amorphous, thermoplastic polyimide dissolved in a solvent selected from the group consisting of: N,N-methylpyrolidinone (NMP); dimethylacetamide (DMAc); and dimethylformamide (DMF); an electronic conductive filler, and a metal oxide;
c) preparing an electrolyte solution comprising a third, soluble amorphous, thermoplastic polyimide dissolved in a solvent selected from the group consisting of: N,N-methylpyrolidinone (NMP); dimethylacetamide (DMAc); and dimethylformamide (DMF); and a lithium salt;
d) casting a film of the electrolyte solution to form an electrolyte layer;
e) coating the anode slurry on a first current collector to form an anode;
f) coating the cathode slurry on a second current collector to form a cathode;
g) drying the electrolyte layer, the anode, and the cathode;
h) soaking the anode in a lithium salt solution; and
i) assembling the anode, the electrolyte layer, and the cathode to form a battery.

54. A process according to claim 53, wherein the first soluble, amorphous, thermoplastic polyimide solution is prepared by mixing a first soluble, amorphous, thermoplastic polyimide powder with a solvent.

55. A process according to claim 53, wherein the second soluble, amorphous, thermoplastic polyimide solution is prepared by mixing a second soluble, amorphous, thermoplastic polyimide powder with a solvent.

56. A process according to claim 53, wherein the third soluble, amorphous, thermoplastic polyimide solution is prepared by mixing a third soluble, amorphous, thermoplastic polyimide powder with a solvent.

57. A process according to claim 54, wherein a lithium salt is added to the first soluble, amorphous, thermoplastic polyimide solution.

58. A process according to claim 55, wherein a lithium salt is added to the second soluble, amorphous, thermoplastic polyimide solution.

59. A process according to claim 53, wherein the battery is assembled by:
   a) providing the anode;
   b) applying at least one drop of the electrolyte solution to the anode;
   c) positioning the electrolyte layer over the anode wherein the electrolyte solution is disposed therebetween;
   d) applying at least one drop of the electrolyte solution to the electrolyte layer;
   e) positioning the cathode over the electrolyte layer wherein the electrolyte solution is disposed therebetween to form an assembly;
   f) heating the assembly at a temperature sufficient to allow the electrolyte solution to dry and wherein each soluble, amorphous, thermoplastic polyimide undergoes melt flow; and
   g) cooling the assembly to room temperature.

60. A process according to claim 59, further comprising the step of enclosing the assembly in a protective casing.

61. A battery prepared according to the process of claim 60.

62. A process according to claim 53, wherein the electrolyte layer, the anode and the cathode are dried to a tacky state.

63. A process according to claim 62, wherein the battery is assembled by:
   a) providing the anode;
   b) positioning the electrolyte layer over the anode;
   c) positioning the cathode over the electrolyte layer to form an assembly; and
   d) applying pressure to the assembly.

64. A process according to claim 63, further comprising the steps of heating the assembly to a temperature wherein each soluble, amorphous, thermoplastic, polyimide undergoes melt flow and cooling the assembly to room temperature.

65. A process according to claim 64, further comprising the step of enclosing the assembly in a protective casing.

66. A battery prepared according to the process of claim 65.

67. A battery prepared according to the process of claim 53.

* * * * *